(12) United States Patent
Sinur (10) Patent No.: US 8,789,283 B2
(45) Date of Patent: Jul. 29, 2014

(54) RECIPROCATING SAW

(75) Inventor: Robert A. Sinur, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 399 days.

(21) Appl. No.: 13/279,910

(22) Filed: Oct. 24, 2011

(65) Prior Publication Data

US 2012/0096721 A1 Apr. 26, 2012

Related U.S. Application Data

(60) Provisional application No. 61/406,241, filed on Oct. 25, 2010.

(51) Int. Cl.
*B23D 51/20* (2006.01)
*B23D 49/10* (2006.01)
*B27B 19/02* (2006.01)

(52) U.S. Cl.
USPC ............... 30/394; 30/392; 74/60; 173/114

(58) Field of Classification Search
USPC ........................................... 30/392, 393, 394
See application file for complete search history.

(56) References Cited

U.S. PATENT DOCUMENTS

| | | | | |
|---|---|---|---|---|
| 3,461,732 A | * | 8/1969 | Gregory | 74/60 |
| 5,036,925 A | * | 8/1991 | Wache | 173/48 |
| 5,134,777 A | | 8/1992 | Meyer et al. | |
| 6,234,255 B1 | | 5/2001 | Feldmann et al. | |
| RE37,211 E | | 6/2001 | Bednar et al. | |
| 6,357,125 B1 | | 3/2002 | Feldmann et al. | |
| 6,772,662 B2 | * | 8/2004 | Marinkovich et al. | 83/34 |
| 7,658,012 B2 | | 2/2010 | James et al. | |
| 8,307,910 B2 | * | 11/2012 | Holmes et al. | 173/19 |
| 2001/0034942 A1 | * | 11/2001 | Marinkovich et al. | 30/393 |
| 2002/0170186 A1 | * | 11/2002 | Sakaguchi | 30/394 |

* cited by examiner

*Primary Examiner* — Hwei C Payer
(74) *Attorney, Agent, or Firm* — Michael Best & Friedrich LLP (57) ABSTRACT

A reciprocating saw includes a motor and a drive shaft driven by the motor. The drive shaft defines a longitudinal axis. The reciprocating saw also includes a wobble plate coupled to the drive shaft. The wobble plate extends from the drive shaft at an oblique angle relative to the longitudinal axis. The reciprocating saw further includes a spindle coupled to and reciprocated by the wobble plate. The spindle has a stroke length. The reciprocating saw also includes an adjustment mechanism coupled to the wobble plate. The adjustment mechanism is operable to adjust the stroke length of the spindle.

16 Claims, 6 Drawing Sheets

RECIPROCATING SAW

CROSS-REFERENCE TO RELATED APPLICATIONS

This application claims priority to U.S. Provisional Patent Application No. 61/406,241, filed Oct. 25, 2010 by Robert A. Sinur and titled, "RECIPROCATING SAW," the entire contents of which are incorporated by reference herein.

FIELD OF THE INVENTION

The present invention relates to power tools and, more particularly, to reciprocating saws.

SUMMARY OF THE INVENTION

In one embodiment, the invention provides a reciprocating saw including a motor and a drive shaft driven by the motor. The drive shaft defines a longitudinal axis. The reciprocating saw also includes a wobble plate coupled to the drive shaft. The wobble plate extends from the drive shaft at an oblique angle relative to the longitudinal axis. The reciprocating saw further includes a spindle coupled to and reciprocated by the wobble plate. The spindle has a stroke length. The reciprocating saw also includes an adjustment mechanism coupled to the wobble plate. The adjustment mechanism is operable to adjust the stroke length of the spindle.

In another embodiment, the invention provides a reciprocating saw including a motor and a drive shaft driven by the motor. The drive shaft defines a longitudinal axis. The reciprocating saw also includes a wobble plate coupled to the drive shaft. The wobble plate extends from the drive shaft at an oblique angle relative to the longitudinal axis. The reciprocating saw further includes a spindle coupled to and reciprocated by the wobble plate and an adjustment mechanism coupled to the wobble plate. The adjustment mechanism is movable between a first position such that the wobble plate extends from the drive shaft at a first utmost angle relative to the longitudinal axis, and a second position such that the wobble plate extends from the drive shaft at a second utmost angle relative to the longitudinal axis. The second utmost angle is different than the first utmost angle.

In yet another embodiment, the invention provides a reciprocating saw including a housing, a motor positioned substantially within the housing, and a drive shaft driven by the motor. The drive shaft defines a longitudinal axis. The reciprocating saw also includes a swashplate pivotally coupled to the drive shaft for rotation with and pivotal movement relative to the drive shaft and a wobble plate supported by the swashplate. The wobble plate extends from the swashplate at an oblique angle relative to the longitudinal axis. The reciprocating saw further includes a spindle coupled to the wobble plate for reciprocation relative to the housing and an adjustment mechanism coupled to the swashplate. The adjustment mechanism is movable between a first position, in which the swashplate is tilted relative to the drive shaft such that the wobble plate extends from the swashplate at a first utmost angle relative to the longitudinal axis to reciprocate the spindle through a first stroke length, and a second position, in which the swashplate is tilted relative to the drive shaft such that the wobble plate extends from the swashplate at a second utmost angle relative to the longitudinal axis to reciprocate the spindle through a second stroke length. The second utmost angle and the second stroke length are different than the first utmost angle and the first stroke length, respectively.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
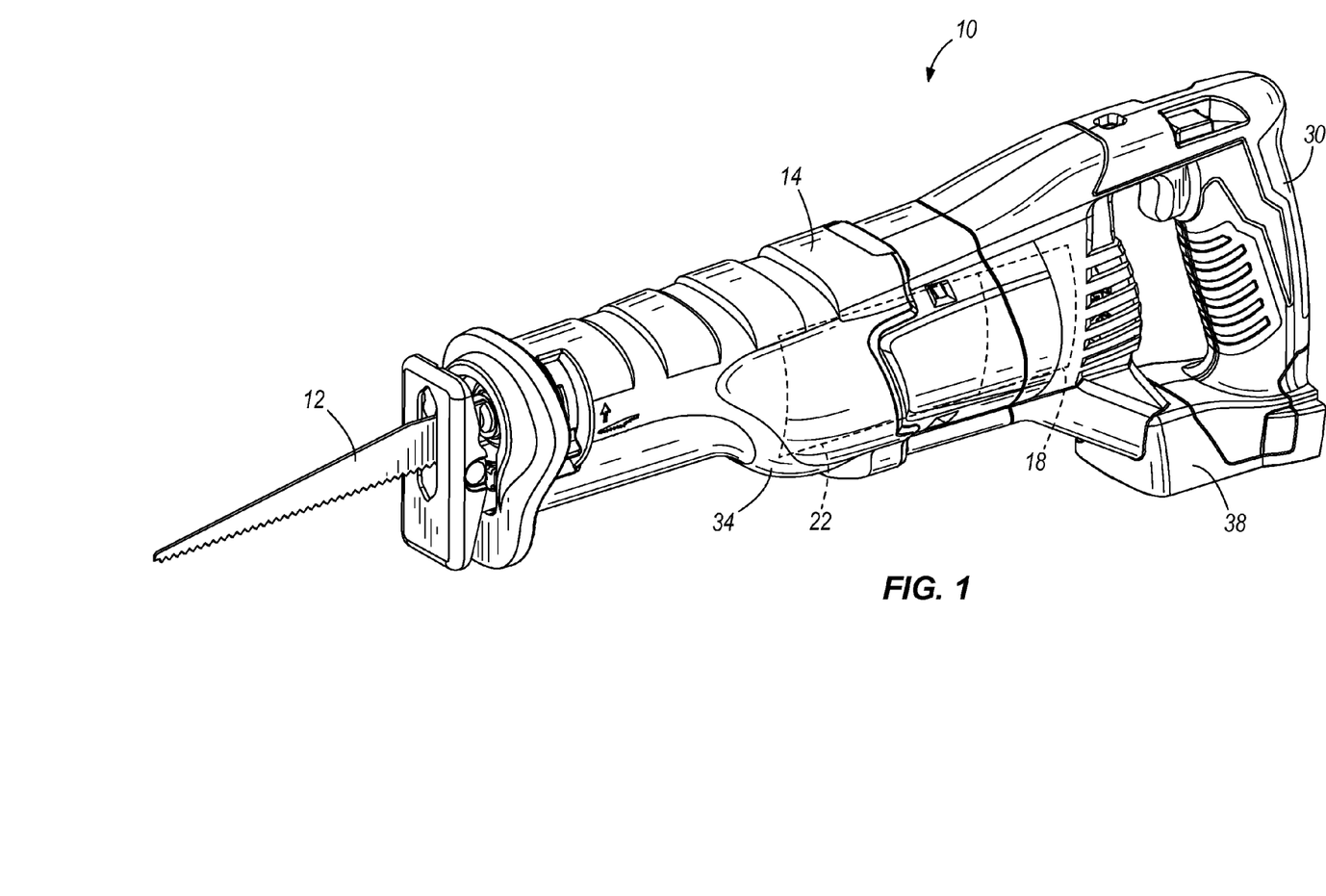
FIG. 1 is a perspective view of a reciprocating saw according to one embodiment of the invention.

FIG. 1 illustrates a power tool according to one embodiment of the invention. In the illustrated embodiment, the power tool is a reciprocating saw 10 that is operable to drive a tool element (e.g., a saw blade 12) in a reciprocating motion for cutting a work piece. In other embodiments, the power tool may be a different type of device that is configured to drive a tool element in a reciprocating motion.

Figure 2:
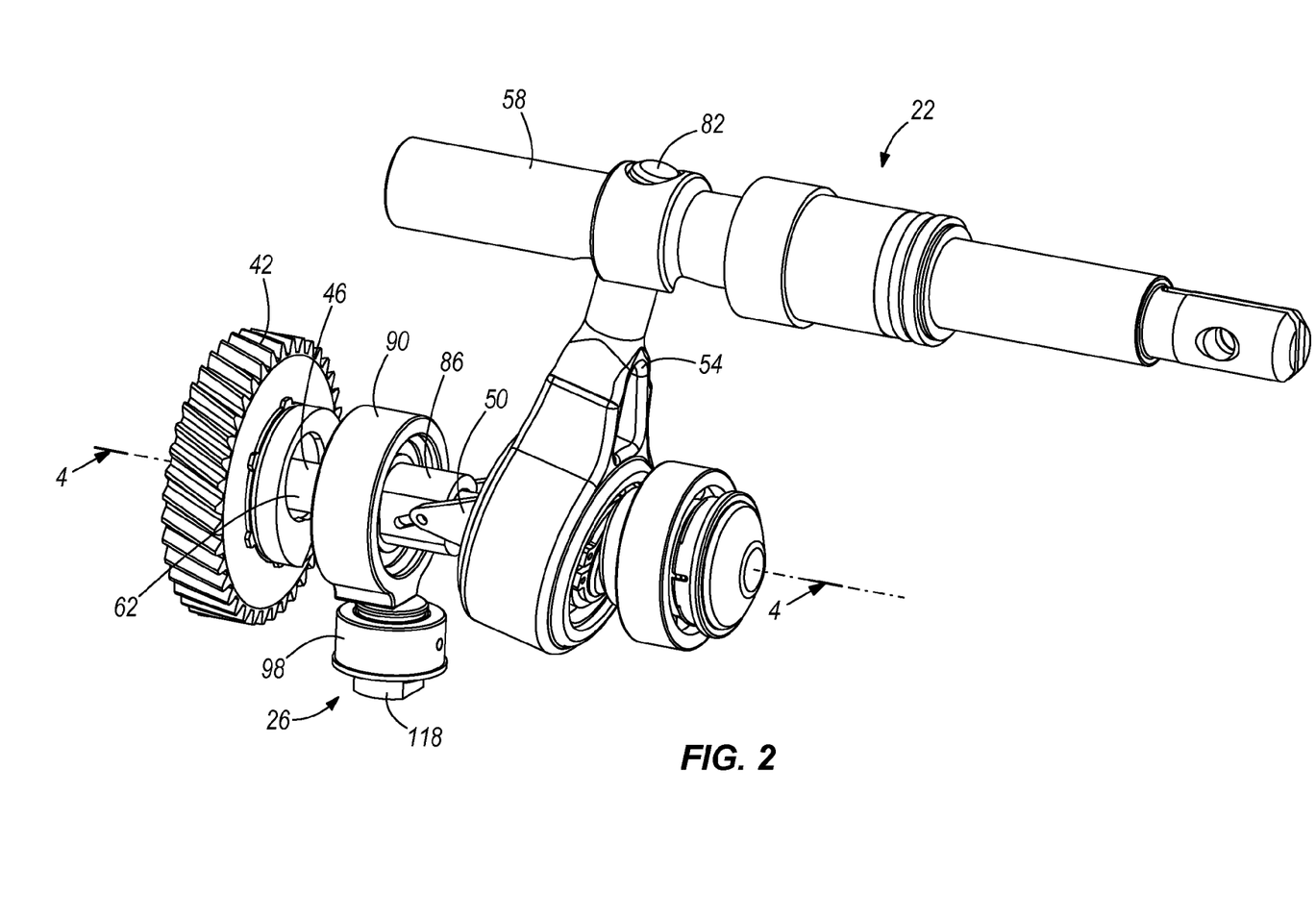
FIG. 2 is a perspective view of a drive mechanism for use with the reciprocating saw shown in FIG. 1.

The illustrated reciprocating saw 10 includes a housing 14, a motor 18 positioned substantially within the housing 14, a drive mechanism 22 coupled to the motor 18, and an adjustment mechanism 26 (FIG. 2) coupled to the drive mechanism 22. The housing 14 includes a grip portion 30 configured to be grasped by a user, a support portion 34 configured to house and support the motor 18 and the drive mechanism 22, and a connection portion 38 configured to support a battery pack.

The motor 18 is coupled to the drive mechanism 22 to drive the drive mechanism 22 and reciprocate the saw blade 12. The motor 18 is connectable to a power source that provides power to the motor 18. In the illustrated embodiment, the motor 18 is a DC motor that is connectable to a portable power source such as, for example, a Li-ion, Ni—Cd, or NiMH battery pack. In other embodiments, the motor 18 may be an AC motor and the reciprocating saw 10 may be a corded power tool.

As shown in FIGS. 2-6, the illustrated drive mechanism 22 includes a drive gear 42, a drive shaft 46, a swashplate 50, a wobble plate 54, and a spindle 58. The drive gear 42 engages a pinion of the motor 18 (FIG. 1) such that the drive gear 42 is driven (e.g., rotated) by the motor 18. The drive gear 42 is mounted to the drive shaft 46, or axle, such that the drive shaft 46 rotates with the drive gear 42. In some embodiments, a gear reduction mechanism, such as, for example, a planetary gear arrangement, may be coupled between the motor pinion and the drive gear 42 or between the drive gear 42 and the drive shaft 46. In the illustrated embodiment, the drive shaft 46 includes a splined outer surface 62 that engages the drive gear 42 to transmit rotation of the gear 42 to the shaft 46. In other embodiments, the drive gear 42 may be coupled to the drive shaft 46 using other suitable coupling means. The drive shaft 46 defines a longitudinal axis 66 about which the drive shaft 46 and the drive gear 42 rotate.

Figure 4:
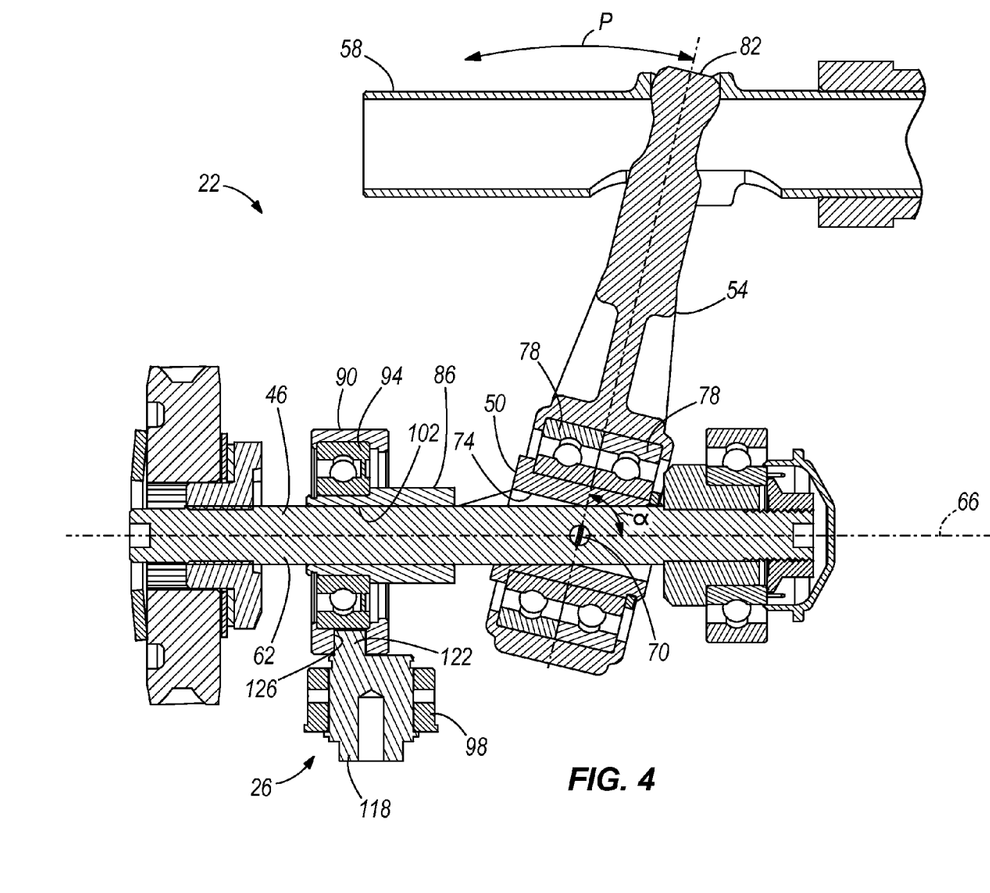
FIG. 4 is a cross-sectional view of the drive mechanism taken along section line 4-4 of FIG. 2.
Figure 6:
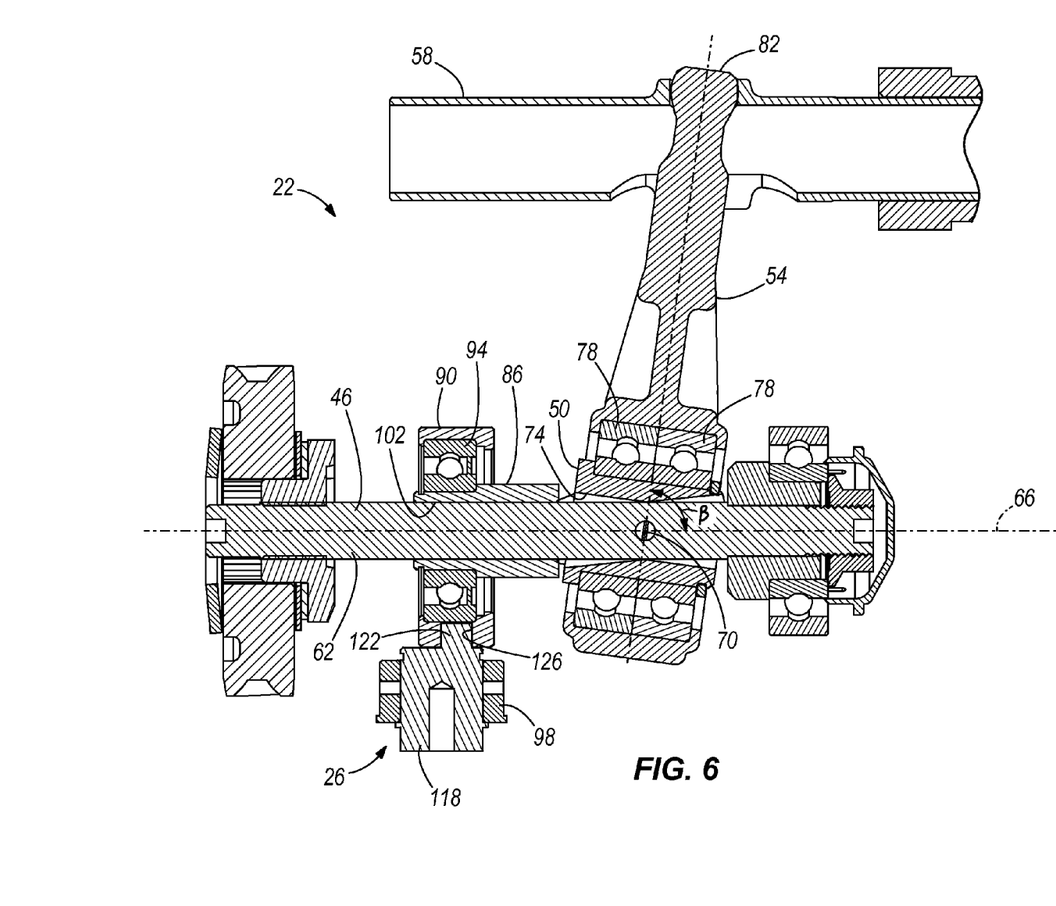
FIG. 6 is a cross-sectional view of the drive mechanism shown in FIG. 5.

The swashplate 50 is spaced apart from the drive gear 42 and mounted to the drive shaft 46 for rotation with the drive shaft 46. In the illustrated embodiment, the swashplate 50 is mounted to the shaft 46 by a pin 70 (FIGS. 4 and 6). The pin 70 extends through the swashplate 50 and the drive shaft 46 to pivotally couple the swashplate 50 to the drive shaft 46. In other embodiments, the swashplate 50 may include other suitable coupling means to pivotally couple the swashplate 50 to the drive shaft 46. The swashplate 50 defines an opening 74 (FIGS. 4 and 6) that receives the drive shaft 46 such that the swashplate 50 surrounds a portion of the drive shaft 46. The illustrated opening 74 is defined by two converging conical surfaces such that most of the opening 74 has a larger diameter than an outer diameter of the drive shaft 46, allowing the swashplate 50 to pivot about the pin 70 relative to the drive shaft 46.

Figure 3:
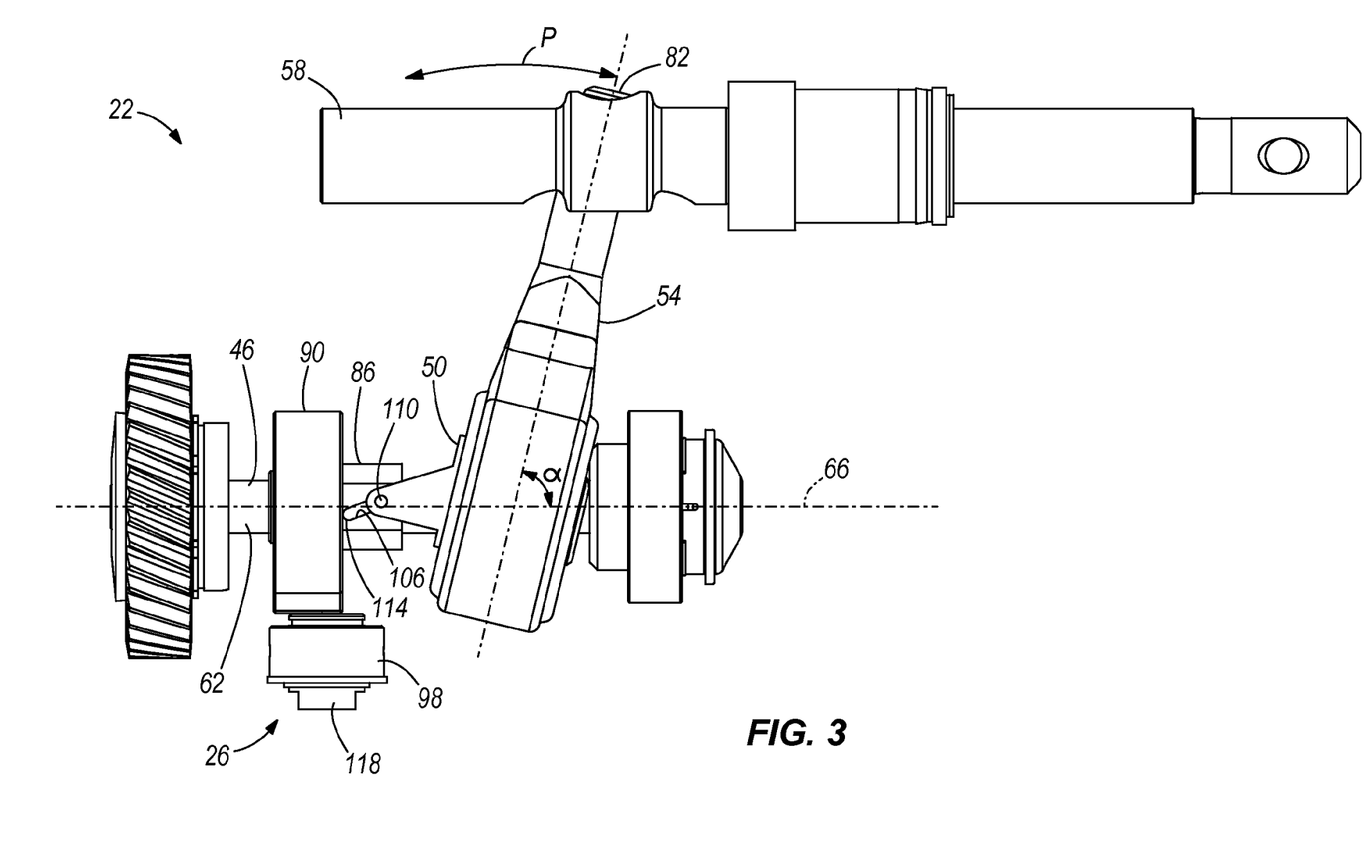
FIG. 3 is a side view of the drive mechanism including a wobble plate oriented at a first utmost angle for reciprocating a spindle through a relatively long stroke.

The wobble plate 54 is coupled to and supported by the swashplate 50. Bearings 78 (FIGS. 4 and 6) are positioned between the wobble plate 54 and the swashplate 50 to facilitate rotation of the swashplate 50 relative to the wobble plate 54. In some embodiments, the wobble plate 54 and the bearings 78 may be secured to the swashplate 50 with snap rings. As shown in FIGS. 3 and 4, the wobble plate 54 extends from the swashplate 50 at an oblique angle $\alpha$ relative to the longitudinal axis 66 of the drive shaft 46. The illustrated oblique angle $\alpha$ is the utmost angle at which the wobble plate 54 extends from the swashplate 50 (i.e., when the wobble plate 54 is at its most extreme angle relative to the drive shaft 46). In this position, the wobble plate 54 extends generally away from the motor 18 and the drive gear 42 to move the saw blade 12 to an extended position. As the drive shaft 46 and the swashplate 50 rotate, the wobble plate 54 follows the swashplate 50 such that an end portion 82 of the wobble plate 54 opposite the drive shaft 46 moves through an arcuate path P. After a half rotation of the drive shaft 46, the wobble plate 54 extends from the swashplate 50 at substantially the same oblique angle $\alpha$ relative to the longitudinal axis, but generally toward the motor 18 and the drive gear 42 to move the saw blade 12 to a retracted position. The utmost angle of the wobble plate 54 thereby controls the extent or length of the arcuate path P through which the end portion 82 may travel.

The spindle 58 is coupled to the end portion 82 of the wobble plate 54 and reciprocates relative to the housing 14. As the wobble plate 54 moves through the arcuate path P, the end portion 82 of the wobble plate 54 pushes the spindle 58 to slide the spindle 58 in a generally linear manner relative to the housing 14. Rotation of the drive shaft 46 is thereby translated into reciprocation of the spindle 58 by the swashplate 50 and the wobble plate 54. The spindle 58 connects to and supports the saw blade 12 (or other tool element) to reciprocate the saw blade 12 relative to the housing 14.

As shown in FIGS. 2-6, the adjustment mechanism 26 is coupled to the drive mechanism 22 to change or alter the utmost oblique angle $\alpha$, $\beta$ of the wobble plate 54 relative to the drive shaft 46. By changing the utmost oblique angle $\alpha$, $\beta$ of the wobble plate 54, the adjustment mechanism 26 adjusts the stroke length of the spindle 58. In the illustrated embodiment, the adjustment mechanism 26 is operable to adjust the stroke length of the spindle 58 and the saw blade 12 from a first, relatively long stroke length to a second, relatively short stroke length. In other embodiments, the adjustment mechanism 26 may be operable to adjust the stroke length of the spindle 58 and the saw blade 12 between three or more different stroke lengths. In still other embodiments, the stroke length of the spindle 58 and the saw blade 12 may be infinitely adjustable within a range of stroke lengths.

Figure 5:
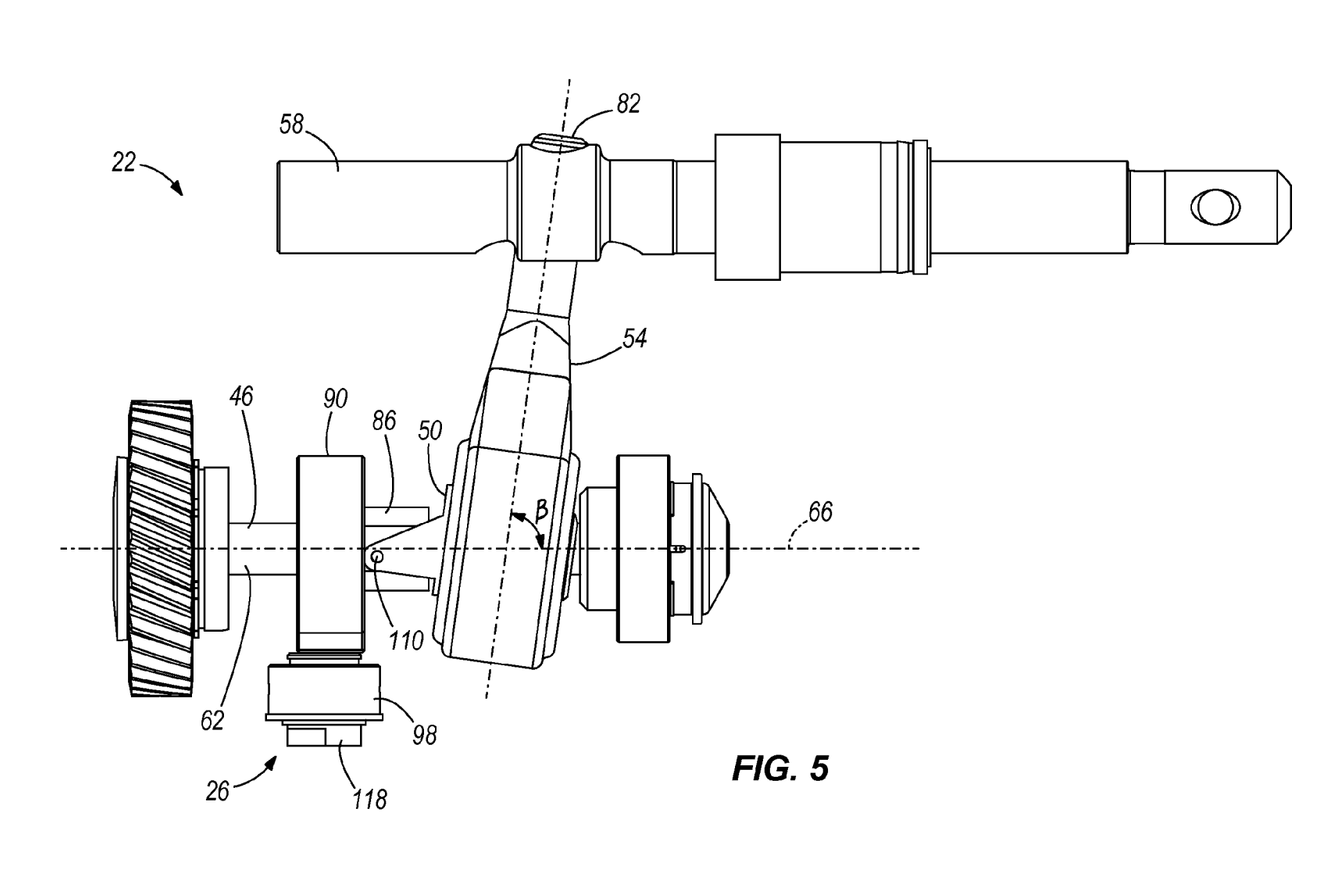
FIG. 5 is a side view of the drive mechanism including the wobble plate oriented at a second utmost angle for reciprocating the spindle through a relatively short stroke.

The illustrated adjustment mechanism 26 includes a bushing 86, a ring member 90, a bearing 94, and an actuator 98. The bushing 86 is mounted to and surrounds a portion of the drive shaft 46 between the swashplate 50 and the drive gear 42. In the illustrated embodiment, the bushing 86 includes a splined inner surface 102 (FIGS. 4 and 6) that engages the splined outer surface 62 of the drive shaft 46 such that the bushing 86 rotates with the drive shaft 46, but may slide axially relative to the shaft 46 between a first position (FIGS. 3 and 4) and a second position (FIGS. 5 and 6). In other embodiments, the bushing 86 may be mounted to the drive shaft 46 using other suitable coupling means. In still other embodiments, the bushing 86 may be rotatable relative the drive shaft 46.

The bushing 86 is coupled to swashplate 50 to pivot the swashplate 50 about the pin 70 relative to the drive shaft 46. In the illustrated embodiment, the bushing 86 defines a slot 106 (FIG. 3) that receives a guide pin 110 coupled to the swashplate 50. In other embodiments, the relative positions of the slot 106 and the guide pin 110 may be reversed. As the bushing 86 slides axially along the drive shaft 46, the guide pin 110 moves between a first end of the slot 106 and a second end 114 (FIG. 3) of the slot 106. As shown in FIGS. 3 and 4, the bushing 86 is in the first position and the guide pin 106 is located at the first end of the slot 106. In this position, the swashplate 50 is tilted relative to the drive shaft 46 such that the wobble plate 54 extends at the first utmost angle $\alpha$ relative to the longitudinal axis 66 and the spindle 58 has a first stroke length. In some embodiments, the first utmost angle $\alpha$ may be between about 73 degrees and about 80 degrees. In the illustrated embodiment, the first utmost angle $\alpha$ is about 76.5 degrees and the first stroke length is about 1.25 inches. As shown in FIGS. 5 and 6, the bushing 86 is in the second position and the guide pin 110 is located at the second end 114 of the slot 106. In this position, the swashplate 50 is tilted relative to the drive shaft 46 such that the wobble plate 54 extends at the second utmost angle $\beta$ relative to the longitudinal axis 66 and the spindle 58 has a second stroke length. In some embodiments, the second utmost angle $\beta$ may be between about 78 degrees and about 86 degrees. In the illustrated embodiment, the second utmost angle $\beta$ is about 82 degrees and the second stroke length is about 0.75 inches. In other embodiments, the utmost angles $\alpha$, $\beta$ of the wobble plate 54 relative to the axis 66 and/or the stroke lengths of the spindle 58 may be larger or smaller.

The ring member 90 and the bearing 94 are mounted to the bushing 86 and surround a portion of the drive shaft 46. The bearing 94 is positioned between the bushing 86 and the ring member 90 to facilitate rotation of the bushing 86 relative to the ring member 90. The bearing 94 is secured to both the ring member 90 and the bushing 86 to inhibit axial movement of the bushing 86 relative to the ring member 90.

The actuator 98 is coupled to the ring member 90 to move the bushing 86 between the first position (FIGS. 3 and 4) and the second position (FIGS. 5 and 6). In the illustrated embodiment, the actuator 98 includes a rotatable dial 118 and a projection 122 (FIGS. 4 and 6). At least a portion of the dial 118 extends outwardly from the housing 14 (FIG. 1) such that a user may access and actuate the dial 118 without disassembling the reciprocating saw 10. In other embodiments, the actuator 98 may also or alternatively include, for example, a push button or a slidable lever to move the bushing 86 between the first and second positions.

The projection 122 extends radially from the dial 118 into a slot 126 formed in the ring member 90. In other embodiments, the ring member 90 may include the projection 122 and the actuator 98 may define the slot 126. Actuating (e.g., rotating) the dial 118 pushes the projection 122 against the ring member 90 to axially displace the ring member 90, and thereby the bushing 86, along the drive shaft 46. For example, when the bushing 86 is in the first position (FIGS. 3 and 4), rotating the dial 118 in one direction moves the ring member 90 and the bushing 86 toward the swashplate 50 (e.g., to the right in FIGS. 3 and 4). When the bushing 86 is in the second position (FIGS. 5 and 6), rotating the dial 118 in the opposite direction moves the ring member 90 and the bushing 86 away from the swashplate 50 (e.g., to the left in FIGS. 5 and 6).

In some embodiments, the adjustment mechanism 26 may include a detent assembly to releasably secure the bushing 86 in the first position and in the second position. The detent assembly may be positioned between, for example, the actuator 98 and the housing 14 to inhibit unintentional actuation of the dial 118 unless initiated by a user. In other embodiments, the detent assembly may be positioned between the drive shaft 46 and the bushing 86 to inhibit unintentional axial movement of the bushing 86. Additionally or alternatively, the adjustment mechanism 26 may include one or more biasing members to bias the bushing 86 toward the first position and/or the second position such that the bushing 86 does not remain in any intermediate positions.

In other embodiments, the adjustment mechanism 26 may include a ratchet mechanism to move the bushing 86 between the first position and the second position. In such embodiments, the ratchet mechanism may be incrementally actuated to adjust the utmost angle α, β of the wobble plate 54 relative to the longitudinal axis 66 of the drive shaft 46.

In still other embodiments, the adjustment mechanism 26 may include a cam member to pivot the swashplate 50 relative to the drive shaft 46. In such embodiments, the cam member may be rotated and/or axially displaced to adjust the utmost angle α, β of the wobble plate 54 relative to the longitudinal axis 66 of the drive shaft 46.

During operation of the illustrated reciprocating saw 10, the bushing 86 is in either the first position (FIGS. 3 and 4) or the second position (FIGS. 5 and 6). When the bushing 86 is in the first position, the guide pin 110 is positioned at the first end of the slot 106 such that the wobble plate 54 extends from the swashplate 50 at the first utmost angle α relative to the longitudinal axis 66. In this position, the end portion 82 of the wobble plate 54 moves through a relatively long arcuate path P when driven by the motor 18. The spindle 58 and attached saw blade 12 are thereby reciprocated through a relatively long cutting stroke. Reciprocating the saw blade 12 through a longer stroke creates a relatively faster cutting motion.

If a user desires to decrease or shorten the stroke length of the spindle 58, the user actuates (e.g., rotates) the dial 118. When the dial 118 is rotated, the projection 122 pushes the ring member 90 to move the ring member 90 and the bushing 86 toward the swashplate 50 (i.e., to the second position shown in FIGS. 5 and 6). As the bushing 86 slides toward the swashplate 50, the guide pin 110 moves from the first end of the slot 106 to the second end 114 of the slot 106. Moving the guide pin 110 to the second end 114 pivots the swashplate 50 about the pin 70 such that the wobble plate 54 extends from the swashplate 50 at the second utmost angle β relative to the longitudinal axis 66. In this position, the end portion 82 of the wobble plate 54 moves through a relatively short arcuate path P when driven by the motor 18. The spindle 58 and the saw blade 12 are thereby reciprocated through a relatively short cutting stroke. Reciprocating the saw blade 12 through a shorter stroke allows the reciprocating saw 10 to be used in more confined areas without interference from surrounding structures (e.g., pipes, studs, wall boards, etc.).

To return the saw blade to the longer cutting stroke, the user actuates (e.g., rotates) the dial 118 in the opposite direction. When the dial 118 is rotated, the projection 122 pushes the ring member 90 to move the ring member 90 and the bushing 86 away from the swashplate 50 (i.e., to the first position shown in FIGS. 3 and 4). As the bushing 86 slides away from the swashplate 50, the guide pin 110 moves from the second end 114 of the slot to the first end of the slot. Moving the guide pin 110 to the first end pivots the swashplate 50 about the pin 70 such that the wobble plate 54 extends from the swashplate 50 at the first utmost angle α relative to the longitudinal axis 66.

Although the invention has been described in detail with reference to certain preferred embodiments, variations and modifications exist within the scope and spirit of one or more independent aspects of the invention as described. For example, in some embodiments, the drive mechanism 22 may include two wobble plates. In such embodiments, one of the wobble plates may be used to reciprocate the spindle 58, as discussed above, and the other wobble plate may be used to reciprocate a counterweight. The counterweight can be reciprocated in a substantially opposite direction than the spindle 58 to counterbalance forces generated by the spindle 58 and the saw blade 12 during operation. The wobble plates may be supported by separate swashplates that are both coupled to the adjustment mechanism 26. Actuation of the adjustment mechanism 26 would therefore change the utmost angles of both of the wobble plates relative to the longitudinal axis 66 to adjust the stroke length of the spindle 58 and the stroke length of the counterweight.

Various features and advantages of the invention are set forth in the following claims.

The invention claimed is:

1. A reciprocating saw comprising:
a motor;
a drive shaft driven by the motor, the drive shaft defining a longitudinal axis;
a wobble plate coupled to the drive shaft, the wobble plate extending from the drive shaft at an oblique angle relative to the longitudinal axis;
a swashplate coupled to the drive shaft for rotation with the drive shaft, wherein the wobble plate is supported by the swashplate;
a spindle coupled to and reciprocated by the wobble plate, the spindle having a stroke length; and
an adjustment mechanism coupled to the wobble plate, the adjustment mechanism operable to adjust the stroke length of the spindle, wherein the swashplate is pivotally coupled to the drive shaft for pivotal movement relative to the drive shaft, and wherein the adjustment mechanism is operable to pivot the swashplate relative to the drive shaft to change the oblique angle that the wobble plate extends from the drive shaft.

2. The reciprocating saw of claim 1, wherein the adjustment mechanism is operable to change the oblique angle that the wobble plate extends from the drive shaft to adjust the stroke length of the spindle.

3. The reciprocating saw of claim 1, wherein the adjustment mechanism includes a bushing surrounding a portion of the drive shaft and coupled to the swashplate, and wherein the bushing is slidable along the drive shaft to pivot the swashplate relative to the drive shaft.

4. The reciprocating saw of claim 3, wherein one of the swashplate and the bushing defines a slot and the other of the swashplate and the bushing includes a pin that extends into the slot, and wherein the pin moves within the slot to pivot the swashplate relative to the drive shaft as the bushing slides along the drive shaft.

5. The reciprocating saw of claim 1, wherein the adjustment mechanism includes an actuator, and wherein the actuator is manually operable to adjust the stroke length of the spindle.

6. The reciprocating saw of claim 5, wherein the actuator includes a dial.

7. A reciprocating saw comprising:
a motor;
a drive shaft driven by the motor, the drive shaft defining a longitudinal axis;
a wobble plate coupled to the drive shaft, the wobble plate extending from the drive shaft at an oblique angle relative to the longitudinal axis;
a swashplate coupled to the drive shaft for rotation with the drive shaft, wherein the wobble plate is supported by the swashplate;
a spindle coupled to and reciprocating by the wobble plate; and
an adjustment mechanism coupled to the wobble plate, the adjustment mechanism being movable between a first position such that the wobble plate extends from the drive shaft at a first utmost angle relative to the longitudinal axis, and a second position such that the wobble plate extends from the drive shaft at a second utmost angle relative to the longitudinal axis, the second utmost angle being different than the first utmost angle,
wherein the swashplate is pivotally coupled to the drive shaft for pivotal movement relative to the drive shaft, wherein the swashplate is tilted relative to the drive shaft such that the wobble plate extends at the first utmost angle when the adjustment mechanism is in the first position, and wherein the swashplate is tilted relative to the drive shaft such that the wobble plate extends at the second utmost angle when the adjustment mechanism is in the second position.

8. The reciprocating saw of claim 7, wherein the spindle has a first stroke length when the wobble plate extends from the drive shaft at the first utmost angle and a second stroke length when the wobble plate extends from the drive shaft at the second utmost angle, and wherein the first stroke length is different than the stroke length.

9. The reciprocating saw of claim 8, wherein the first stroke length is about 1.25 inches, and wherein the second stroke length is about 0.75 inches.

10. The reciprocating saw of claim 7, wherein the first utmost angle is between about 73 degrees and about 80 degrees, and wherein the second utmost angle is between about 73 degrees and about 80 degrees, and the second utmost angle is between about 78 degrees and about 86 degrees.

11. The reciprocating saw of claim 10, wherein the first utmost angle is about 76.5 degrees and the second utmost angle is about 82 degrees.

12. The reciprocating saw of claim 7, wherein the adjustment mechanism includes a bushing surrounding a portion of the drive shaft and coupled to the swashplate, and wherein the bushing is slidable along the drive shaft between the first and second positions to pivot the swashplate relative to the drive shaft.

13. The reciprocating saw of claim 12, wherein one of the swashplate and the bushing defines a slot and the other of the swashplate and the bushing includes a pin that extends into the slot, and wherein the pin moves within the slot to pivot the swashplate relative to the drive shaft as the bushing slides along the drive shaft.

14. The reciprocating saw of claim 7, wherein the adjustment mechanism includes an actuator, and wherein the actuator is manually operable to adjust the stroke length of the spindle.

15. A reciprocating saw comprising:
a housing;
a motor positioned substantially within the housing;
a drive shaft driven by the motor, the drive shaft defining a longitudinal axis;
a swashplate pivotally coupled to the drive shaft for rotation with and pivotal movement relative to the drive shaft;
a wobble plate supported by the swashplate, the wobble plate extending from the swashplate at an oblique angle relative to the longitudinal axis;
a spindle coupled to the wobble plate for reciprocating relative to the housing; and
an adjustment mechanism coupled to the swashplate, the adjustment mechanism being movable between a first position, in which the swashplate is tilted relative to the drive shaft such that the wobble plate extends from the swashplate at a first utmost angle relative to the longitudinal axis to reciprocate the spindle through a first stroke length, and a second position, in which the swashplate is tilted relative to the drive shaft such that the wobble plate extends from the swashplate at a second utmost angle relative to the longitudinal axis to reciprocate the spindle through a second stroke length, the second utmost angle and the second stroke length being different than the first utmost angle and the first stroke length, respectively.

16. The reciprocating saw of claim 15, wherein the adjustment mechanism includes
a bushing surrounding a position of the drive shaft and coupled to the swashplate, the bushing being slidable along the drive shaft between the first and second positions to pivot the swashplate relative to the drive shaft, and
an actuator extending from the housing, the actuator being manually operable to slide the bushing along the drive shaft between the first and second positions.

\* \* \* \* \*